United States Patent
Vassilieva et al.

(10) Patent No.: US 10,225,008 B1
(45) Date of Patent: Mar. 5, 2019

(54) SYSTEMS AND METHODS FOR RECONFIGURING AN ADAPTIVE OPTICAL NETWORK WHEN ADDING AN OPTICAL PATH

(71) Applicant: Fujitsu Limited, Kawasaki-shi, Kanagawa (JP)

(72) Inventors: Olga I. Vassilieva, Plano, TX (US); Inwoong Kim, Allen, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/964,212

(22) Filed: Apr. 27, 2018

(51) Int. Cl.
*H04B 10/079* (2013.01)
*H04J 14/02* (2006.01)

(52) U.S. Cl.
CPC ...... *H04B 10/07953* (2013.01); *H04J 14/021* (2013.01)

(58) Field of Classification Search
None
See application file for complete search history.

(56) References Cited

U.S. PATENT DOCUMENTS

2008/0219664 A1* 9/2008 Zaacks .............. H04J 14/0227 398/58
2015/0215037 A1* 7/2015 Adam .............. H04B 10/07953 398/20

OTHER PUBLICATIONS

Bouda, Martin et al. "Accurate prediction of quality of transmission based on a dynamically configurable optical impairment model." *IEEE/OSA Journal of Optical Communications and Networking* 10, Dec. 18, 2017: A102-A109; 8 pages.
Olga Vassilieva, Inwoong Kim, Youichi Akasaka, Martin Bouda, and Motoyoshi Sekiya, "Interplay between PDL and nonlinear effects in coherent polarization multiplexed systems," Opt. Express 19, B357-B362, Nov. 18, 2011; 6 pages.

\* cited by examiner

*Primary Examiner* — Casey Kretzer
(74) *Attorney, Agent, or Firm* — Baker Botts L.L.P.

(57) ABSTRACT

A disclosed method for configuring an optical network includes determining that a measure of performance for a first optical path is approaching a safe threshold and designating the first optical path as at risk for performance degradation due to additional traffic. The method also includes, in response to adding a new optical path, calculating a system margin for the first optical path representing a difference between an OSNR delivered on the first optical path and a required OSNR for error-free operation on the first optical path, determining that the system margin is insufficient to meet an applicable performance level, modifying an operating parameter of a transmitter or receiver of the first optical path and refraining from calculating a system margin for a second optical path that is not designated as at risk for performance degradation. The method may be implemented by a network management system of the optical network.

17 Claims, 10 Drawing Sheets

SYSTEMS AND METHODS FOR RECONFIGURING AN ADAPTIVE OPTICAL NETWORK WHEN ADDING AN OPTICAL PATH

BACKGROUND

Field of the Disclosure

The present disclosure relates generally to optical communication networks and, more particularly, to systems and methods for configuring an adaptive optical network and reconfiguring the adaptive optical network in response to the addition of an optical path.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). Optical networks may also include various optical elements, such as amplifiers, dispersion compensators, multiplexer/demultiplexer filters, wavelength selective switches (WSS), optical switches, couplers, etc. to perform various operations within the network.

The transmission reach of each channel in an optical network may be limited by various factors, such as certain nonlinear effects that undesirably increase noise. Existing optical transport networks are typically configured as fixed (static) networks. These optical networks are designed for worst case, end-of-life scenarios, with system margin requirements that ensure the longest possible reach even as the components of the optical network age. In these optical networks, optical transmission paths on all wavelengths might reach their destinations. However, these networks may exhibit poor network capacity, with large amounts of unused margin for short reach optical transmission paths and in start-of-life scenarios.

SUMMARY

In one aspect, a method for configuring an adaptive optical network is disclosed. The method may include determining that a measure of performance for a first optical path of a plurality of optical paths in the adaptive optical network is approaching a predetermined safe threshold, the first optical path carrying traffic transmitted between a first transmitter and a first receiver, and designating the first optical path as being at risk for performance degradation due to additional traffic in the adaptive optical network based at least on determining that the measure of performance for the first optical path is approaching the predetermined safe threshold. The method may also include, in response to a new optical path being added in the adaptive optical network, calculating a first system margin for the first optical path in the adaptive optical network, the first system margin representing a difference between an optical signal-to-noise ratio (OSNR) delivered to the first receiver on the first optical path and a required OSNR for error-free operation on the first optical path, determining that the calculated first system margin is insufficient to meet a respective performance level for the first optical path, modifying an operating parameter of the first transmitter or the first receiver based at least on determining that the calculated first system margin is insufficient to meet the given performance level for the first optical path, and refraining from calculating a system margin for a second optical path of the plurality of optical paths in the adaptive optical network that is not designated as being at risk for performance degradation due to additional traffic in the adaptive optical network, the second optical path carrying traffic transmitted between a second transmitter and a second receiver.

In any of the disclosed embodiments, the method may further include, in response to the new optical path being added in the adaptive optical network, calculating a second system margin for a third optical path in the adaptive optical network, the third optical path carrying traffic transmitted between a third transmitter and a third receiver, the second system margin representing a difference between an OSNR delivered to the third receiver on the third optical path and a required OSNR for error-free operation on the third optical path. The method may also include determining that the calculated second system margin is sufficient to meet a respective performance level for the third optical path and refraining from modifying an operating parameter of the third transmitter or the third receiver based at least on determining that the calculated second system margin is sufficient to meet the respective performance level for the third optical path.

In any of the disclosed embodiments, the method may further include generating, for each of the optical paths in the adaptive optical network, a respective probability density function for the measure of performance and determining the safe threshold for the measure of performance for the first optical path based at least on the respective probability density function for the first optical path.

In any of the disclosed embodiments, generating the respective probability density function for the measure of performance may include at least one of monitoring the measure of performance for the plurality of optical paths in the adaptive optical network during operation of the adaptive optical network and generating the respective probability density function for the measure of performance based at least on the monitoring, calculating the respective probability density function using data fitting, estimating the respective probability density function using a Gaussian noise model, and estimating the respective probability density function using a Monte Carlo simulation.

In any of the disclosed embodiments, the measure of performance may include an optical signal-to-noise ratio, a bit error ratio, or a Q-factor.

In any of the disclosed embodiments, modifying an operating parameter of the first transmitter or the first receiver may include modifying at least one of a modulation format, a symbol rate, a forward error correction ratio, and an amount of optical power transmitted by the first transmitter.

In any of the disclosed embodiments, the method may further include, subsequent to modifying the operating parameter of the first transmitter or the first receiver, removing the designation of the first optical path as being at risk for performance degradation due to additional traffic in the adaptive optical network.

In any of the disclosed embodiments, the method may further include, prior to determining that a measure of performance for the first optical path is approaching a predetermined safe threshold, configuring respective pairs of transmitters and receivers in the adaptive optical network, including the first transmitter and the first receiver, to transmit and receive traffic on respective ones of the plurality of optical paths in the adaptive optical network, the configuring including selecting, for each pair of transmitters and receivers, a respective wavelength over which the respective optical path carries traffic based at least on a predetermined system margin for the adaptive optical network and adding the new optical path at a wavelength that is unused by the plurality of optical paths in the adaptive optical network.

In any of the disclosed embodiments, designating the first optical path as being at risk for performance degradation due to additional traffic in the adaptive optical network may include encoding an indication that the first optical path is at risk for performance degradation due to additional traffic in a frequency modulated light label carried along with the traffic transmitted between the first transmitter and the first receiver on the first optical path.

In another aspect, a system for implementing an adaptive optical network is disclosed. The system may include a plurality of optical transponders and a network management system including memory media and a processor having access to the memory media. The memory media may store instructions executable by the processor for determining that a measure of performance for a first optical path of a plurality of optical paths in the adaptive optical network is approaching a predetermined safe threshold, the first optical path carrying traffic transmitted between a first one of the optical transponders and a second one of the optical transponders and designating the first optical path as being at risk for performance degradation due to additional traffic in the adaptive optical network based at least on determining that the measure of performance for the first optical path is approaching the predetermined safe threshold. The memory media may further store instructions executable by the processor for, in response to a new optical path being added in the adaptive optical network, calculating a first system margin for the first optical path in the adaptive optical network, the first system margin representing a difference between an optical signal-to-noise ratio (OSNR) delivered to the first receiver on the first optical path and a required OSNR for error-free operation on the first optical path, determining that the calculated first system margin is insufficient to meet a respective performance level for the first optical path, modifying an operating parameter of the first optical transponder or the second optical transponder based at least on determining that the calculated first system margin is insufficient to meet the given performance level for the first optical path, and refraining from calculating a system margin for a second optical path of the plurality of optical paths in the adaptive optical network that is not designated as being at risk for performance degradation due to additional traffic in the adaptive optical network, the second optical path carrying traffic transmitted between a third one of the optical transponders and a fourth one of the optical transponders.

In any of the disclosed embodiments, the memory media may further store instructions executable by the processor for, in response to the new optical path being added in the adaptive optical network, calculating a second system margin for a third optical path in the adaptive optical network, the third optical path carrying traffic transmitted between a fifth one of the optical transponders and a sixth one of the optical transponders, the second system margin representing a difference between an OSNR delivered to the third receiver on the third optical path and a required OSNR for error-free operation on the third optical path, determining that the calculated second system margin is sufficient to meet a respective performance level for the third optical path, and refraining from modifying an operating parameter of the fifth optical transponder or the sixth optical transponder based at least on determining that the calculated second system margin is sufficient to meet the respective performance level for the third optical path.

In any of the disclosed embodiments, the memory media may further store instructions executable by the processor for generating, for each of the optical paths in the adaptive optical network, a respective probability density function for the measure of performance and determining the safe threshold for the measure of performance for the first optical path based at least on the respective probability density function for the first optical path.

In any of the disclosed embodiments, the measure of performance may include an optical signal-to-noise ratio, a bit error ratio, or a Q-factor.

In any of the disclosed embodiments, modifying an operating parameter of the first optical transponder or the second optical transponder may include modifying at least one of a modulation format, a symbol rate, a forward error correction ratio, and an amount of optical power transmitted by the first optical transponder.

In any of the disclosed embodiments, the memory media may further store instructions executable by the processor for removing the designation of the first optical path as being at risk for performance degradation due to additional traffic in the adaptive optical network subsequent to modifying the operating parameter of the first optical transponder or the second optical transponder.

In any of the disclosed embodiments, the memory media may further store instructions executable by the processor for, prior to determining that a measure of performance for the first optical path is approaching a predetermined safe threshold, configuring respective pairs of optical transponders in the adaptive optical network, including the first optical transponder and the second optical transponder, to transmit and receive traffic on respective ones of the plurality of optical paths in the adaptive optical network, the configuring including selecting, for each pair of optical transponders, a respective wavelength over which the respective optical path carries traffic based at least on a predetermined system margin for the adaptive optical network, and adding the new optical path at a wavelength that is unused by the plurality of optical paths in the adaptive optical network.

In any of the disclosed embodiments, designating the first optical path as being at risk for performance degradation due to additional traffic in the adaptive optical network may include encoding an indication that the first optical path as at risk for performance degradation due to additional traffic in a frequency modulated light label carried along with the traffic transmitted between the first optical transponder and the second optical transponder on the first optical path.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
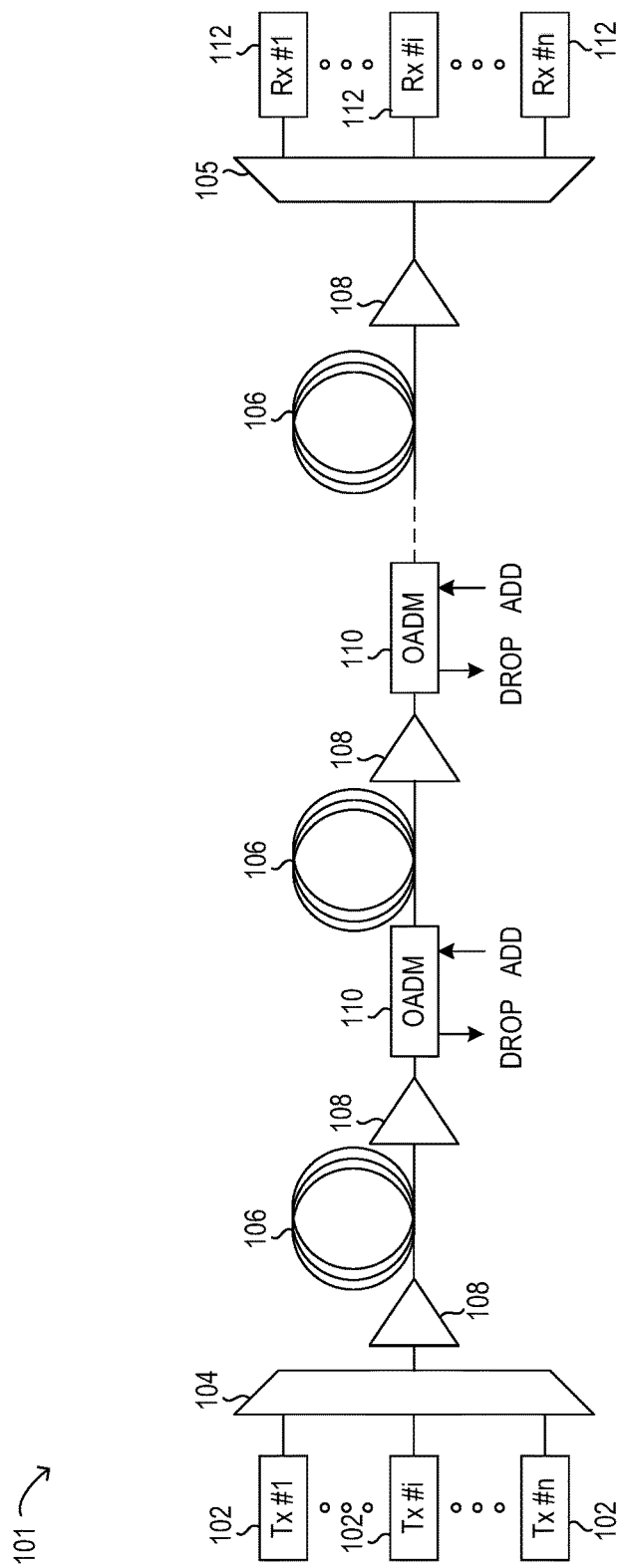
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Optical networks are increasingly being used in applications involving a low cost, yet high data rate for optimal performance and economic feasibility. As data rates for optical networks continue to increase, the demands on optical signal-to-noise ratios (OSNRs) also increase, for example, due to the use of advanced modulation formats, such as m-QAM and m-PSK with dual polarization. For example, higher order m modulation formats have shorter reach and are more sensitive to nonlinear phase noise. Unlike in banking systems, healthcare systems, or other applications in which reliability and accuracy are paramount, optical networks used in lower cost applications may be designed to transmit as much information as possible over the optical network without wasting network capacity due to unused margin.

Optical networks are increasingly becoming adaptive and flexible. These adaptive optical networks may use high capacity transponders that support high spectral efficiency, flexible symbol rates, and flexible modulation formats. The optical transmission paths on different wavelengths may carry traffic using different symbol rates and/or modulation formats of different types or orders. A given optical transmission path between two transponders, also referred to herein as simply an "optical path," may be assigned to any wavelength using any modulation format and any symbol rate suitable for a specific reach based on the current signal quality. As components age, there may be variations in the performance of different transponders. However, in start-of-life conditions, the variations in the performance of different transponders are typically very small. Some existing adaptive optical networks are designed to operate with small margins (and thus, little wasted margin) to increase the network capacity and the cost effectiveness of each optical path by maximizing the delivered traffic. In these existing systems, the processes used to manage the adaptive optical network, which include monitoring the signal quality of all wavelengths and determining, using intelligent software, which modulation formats to use for each optical path, can be extremely complex. In some existing adaptive optical networks, each time an optical path is added to the network at a particular wavelength, it might affect the performance of the optical paths on neighboring wavelengths. In one example, if an adaptive optical network includes a first optical path over which traffic is transmitted using 16-QAM, the addition of a new optical path on a nearby wavelength may degrade the performance of the first optical path to such a degree that its modulation format is changed to 8-QAM in order to meet reach and/or reliability requirements. In some existing systems, system margins are recalculated for all optical paths in the network each time a new optical path is added to determine the effect on neighboring traffic and to determine whether any changes to the configurations of the optical transponders in the system are needed. In at least some embodiments, the systems and methods described herein for reconfiguring an adaptive optical network when adding an optical path may significantly simplify the network management procedure used to determine when such changes are needed, leading to a more cost effective and efficient use of network management resources in the adaptive optical network.

As will be described in further detail, systems and methods for configuring an adaptive optical network and reconfiguring the adaptive optical network in response to the addition of an optical path are disclosed. More specifically, these systems may implement network management for an adaptive network in which wavelengths of different symbol rates and different modulation formats are deployed. The management of the network may be simplified, when compared to existing systems, by initially identifying existing optical paths that are at risk for performance degradation due to additional traffic in the adaptive optical network. For example, in some embodiments, a safe threshold value for a measure of performance may be determined for each optical path. The measure of performance may be monitored during operation and, if the measure of performance approaches the safe threshold value, the optical path may be flagged or otherwise designated as being at risk for performance degradation due to additional traffic in the adaptive optical network.

In at least some embodiments, the system margin for a given optical path may be defined as the difference between the actual optical signal-to-noise ratio (OSNR) value that is delivered to the receiver on the given optical path and the required OSNR for error-free operation on the given optical path. The required OSNR may be specified in terms of the ratio of signal power to noise power in a reference bandwidth of 0.1 nm (e.g., in terms of dB/0.1 nm). When new optical paths are added in the network, system margins may be recalculated only for the optical paths designated as being at risk for performance degradation. If the recalculated system margin for one of the optical paths is insufficient to meet a predetermined performance level or a target reach, an operating parameter of a transponder for the optical path may be modified to re-optimize the affected optical path. This may include, for example, modifying a modulation format, a symbol rate, a forward error correction ratio, or an amount of optical power transmitted by the transmitting transponder, in some embodiments. In some embodiments, the methods for configuring an adaptive optical network and reconfiguring the adaptive optical network in response to the addition of an optical path described herein may be implemented by a network management system for the adaptive optical network and may be dependent on monitoring performed at receiving transponders and/or various feedback mechanisms between optical transponders.

Referring now to the drawings, FIG. 1 illustrates an example embodiment of optical transport network, shown as optical network 101, which may represent an optical communication system. Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a "channel" that is included in an optical signal. Each channel may carry a certain amount of information through optical network 101.

Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Advancements in DWDM enable combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. In a superchannel, a plurality of subcarriers (or subchannels or channels) are densely packed in a fixed bandwidth band and may be transmitted at very high data rates. Furthermore, the superchannel may be well suited for transmission over very long distances, such as hundreds of kilometers, for example. A typical superchannel may comprise a set of subcarriers that are frequency multiplexed to form a single channel that are transmitted through an optical transport network as one entity. The subcarriers within the superchannel may be tightly packed to achieve high spectral efficiency. In particular embodiments, Nyquist frequency-division multiplexing (N-FDM) may be used in a channel. In N-FDM, optical pulses having a nearly rectangular spectrum are packed together in the frequency domain with a bandwidth approaching the baud rate.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength and may transmit the beam for carrying the signal throughout optical network 101. In some embodiments, optical transmitter 102 may be used to determine the baud rate for the data to be transmitted during the optical modulation. An example of transmitter 102 for applying different baud rates is an adaptive rate transponder. Additionally, a forward error correction module may be included in optical transmitter 102 or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion.

In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical network 101, each OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical network 101 may include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical network 101, in various embodiments.

In FIG. 1, optical network 101 may include receivers 112 coupled to demultiplexer 105. Each receiver 112 may receive optical signals transmitted at a particular wavelength or channel and may process the optical signals to obtain (e.g., demodulate) the information (i.e., data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), quadrature amplitude modulation (QAM), pulse amplitude modulation (PAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (m-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. PAM involves scaling the amplitude or intensity of each symbol pulse in the modulated signal to carry information from the input signal. One simple binary implementation of PAM is on-off keying (OOK) or 2-PAM, in which a high amplitude carries a bit value of 1, while a low amplitude carries a bit value of 0 in a single symbol pulse. With multi-level PAM (m-PAM), a number of different levels or values may be encoded to each symbol pulse in the modulated signal. For example, 4-PAM involves 4 amplitude levels per symbol pulse, enabling 2 bits of data to be carried per symbol pulse.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals but may include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology. In operation of optical network 101, each of transmitters 102 and receivers 112 may be enabled to implement two or more modulation formats.

The amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increases in the required OSNR for transmission over optical network 101.

In some embodiments of the present disclosure, higher modulation formats may be used to compress the information for a specific data rate channel. For example, for the same data rate 16-QAM carries approximately twice the number of bits per symbol than does QPSK, therefore requiring half the symbol rate and, consequently, half the spectral bandwidth. Similarly, 64-QAM carries three times the number of bits per symbol than does QPSK and requires one third the spectral bandwidth. Thus, spectral bandwidth can be saved by reducing the symbol rate and increasing the number of bits per symbol to transmit the same data rate. In some cases, however, when using higher order (or maximum order) modulation formats and no FEC overhead bytes, a receiver might not receive all of the transmitted symbols. For example, since higher-level bit loading decreases the distance between the two closest constellation points, 16-QAM and 64-QAM formats suffer from signal-to-noise penalties per bit of 4 dB and 8.5 dB, respectively, when compared with QPSK.

Figure 2:
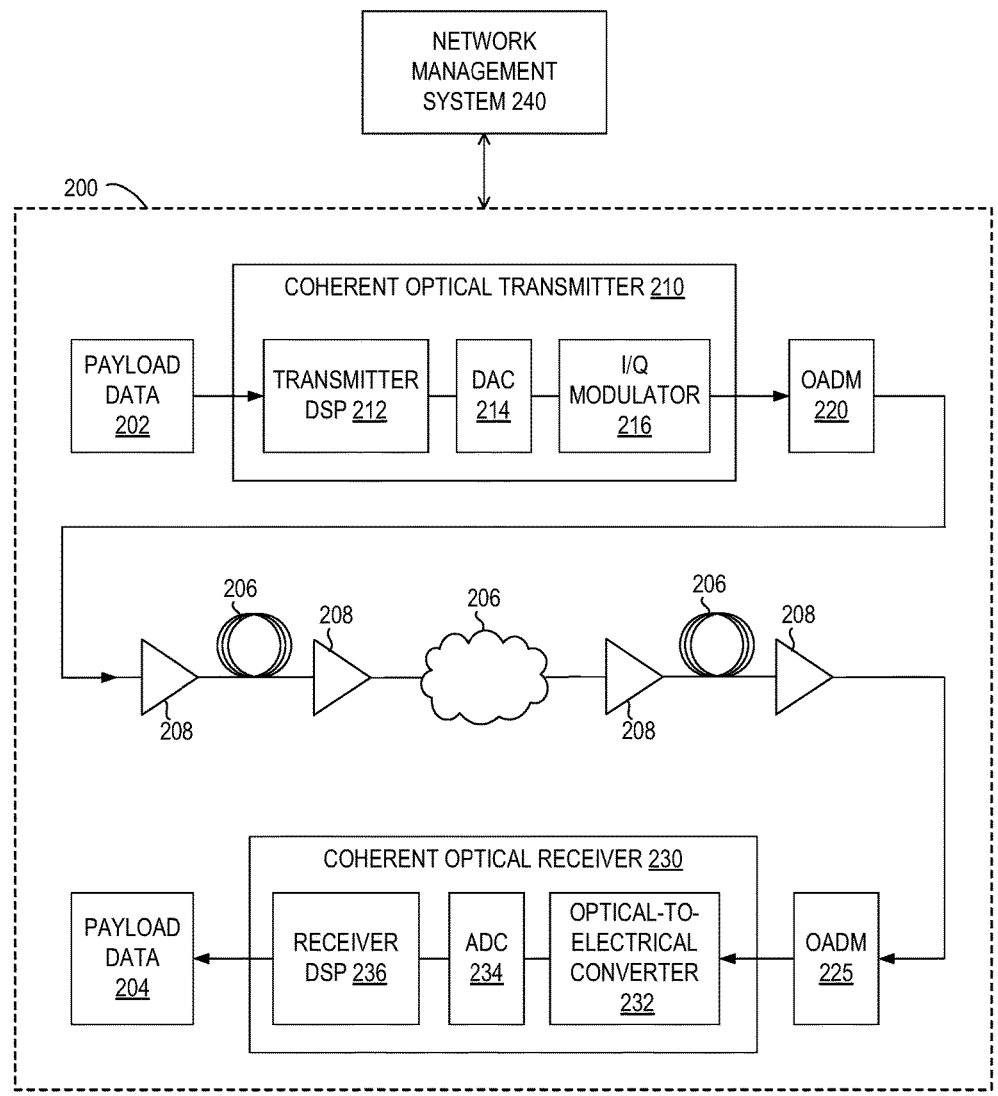
FIG. 2 is a block diagram of selected elements of an embodiment of an optical network.

FIG. 2 is a block diagram of selected elements of an example embodiment of an optical network 200. In some embodiments, optical network 200 may be a software-defined network (SDN) for optical transport. Optical network 200 may include, or be communicatively coupled to, network management system 240, which may communicate with some or all of the devices and/or other elements of optical network 200. In some embodiments, network management system 240 may be similar to network management system 300 illustrated in FIG. 3 and described below. Network management system 240 may implement management plane and/or control plane functionality in optical network 200.

In the example embodiment illustrated in FIG. 2, optical network 200 includes two optical transponders that communicate with each other over fibers 206 (which may be similar to fibers 106 illustrated in FIG. 1 and described above). A first one of the transponders is shown as coherent optical transmitter 210 and a second one of the transponders is shown as coherent optical receiver 230. However, each of these transponders may include all of the elements and functionality of both a coherent optical transmitter and a coherent optical receiver. In this example, payload data 202 is provided to coherent optical transmitter 210 for processing and transmission as an optical signal over fibers 206, and coherent optical receiver 230 receives an optical signal over fibers 206 and processes it to reconstruct transmitted payload data 202 as received payload data 204.

Coherent optical transmitter 210 includes, among other elements, transmitter digital signal processor (DSP) 212, digital-to-analog converter (DAC) 214, and quadrature (I/Q) modulator 216 that collectively convert payload data 202 into an optical signal for transmission over fibers 206. Coherent optical receiver 230 includes, among other elements, receiver DSP 236, analog-to-digital converter (ADC) 234, and optical-to-electrical converter 232 that collectively convert a received optical signal into payload data 204. In some embodiments, each of the optical transponders (such as coherent optical transmitter 210 and coherent optical receiver 230) may include a laser driver, a laser, a modulator, a modulator driver, a clock/data recovery element, an optical amplifier, and/or an optical-to-electrical converter, not all of which are shown in FIG. 2.

Optical network 200 also includes OADMs 220 and 225, which may be similar to OADMs 110 illustrated in FIG. 1 and described above, and multiple optical amplifiers 208, which may be similar to optical amplifiers 108 illustrated in FIG. 1 and described above. As described in more detail below, network management system 240 may include a discovery module, a routing module, a path computation engine, and a signaling module, and may be operable to configure optical network 200 and reconfigure optical network 200 in response to the addition of an optical path in optical network 200. In some embodiments, network management system 240 may be similar to network management controller 300 illustrated in FIG. 3 and described below.

In certain embodiments, pairs of peers in an optical network (e.g., a pair of optical transponders such as coherent optical transmitter 210 and coherent optical receiver 230) may be configured to communicate control information to each other according to a predetermined handshake protocol. In one example in which FEC overhead bytes are enabled for correcting errors, the control information may be communicated in accordance with the handshake protocol using control overhead bytes (e.g., general communication channel bytes, such as GCCO bytes) included in one or more packets exchanged between the optical transponders. In another example, the control information may be communicated in accordance with the handshake protocol using another type of out-of-band channel for communicating control information in the optical network, such as an optical supervisory channel (OSC). In certain embodiments, the handshake protocol may be used to return performance feedback from a receiving optical transponder (e.g., coherent optical receiver 230) to a transmitting optical transponder (e.g., coherent optical transmitter 210). In certain embodiments, the handshake protocol may be used by a transmitting optical transponder (e.g., coherent optical transmitter 210) to communicate clock synchronization information due to the inclusion of extra FEC overhead bytes to a receiving optical transponder (e.g., coherent optical receiver 230). For example, the inclusion of extra FEC overhead bytes changes the data rate for the traffic between the two optical transponders.

In certain embodiments, the optical transponders may be capable of adjusting the number of FEC overhead bytes based on monitored performance measures or on a feedback mechanism between communicating pairs of optical transponders. In at least some embodiments, each of the optical transponders (such as coherent optical transmitter 210 and coherent optical receiver 230) may be enabled to implement two or more modulation formats. For example, each of the transponders may support two or more adaptive modulation formats including, but not limited to, FSK, ASK, BPSK, QPSK, 8-QAM, 16-QAM, 32-QAM, among others. In certain embodiments, an optical transponder may support up to 128 different modulation formats or more. In addition, the optical transponders may be capable of adjusting the symbols rates at which traffic is transmitted over particular optical paths and/or the amount of optical power transmitted. In at least some embodiments, the modulation format, symbol rate, the number of FEC overhead bytes (sometimes referred to as the FEC ratio), and/or the amount of optical power transmitted for a given optical path may be modified by network management system 240 in response to the addition of a new optical path in optical network 200 and the subsequent recalculation of a system margin for an existing path. For example, in certain embodiments, the modulation format, symbol rate, the number of FEC overhead bytes, and/or an amount of optical power transmitted may be modified for an optical path of a given span length that exhibits performance degradation due to nonlinear effects caused by the addition of an optical path.

Figure 3:
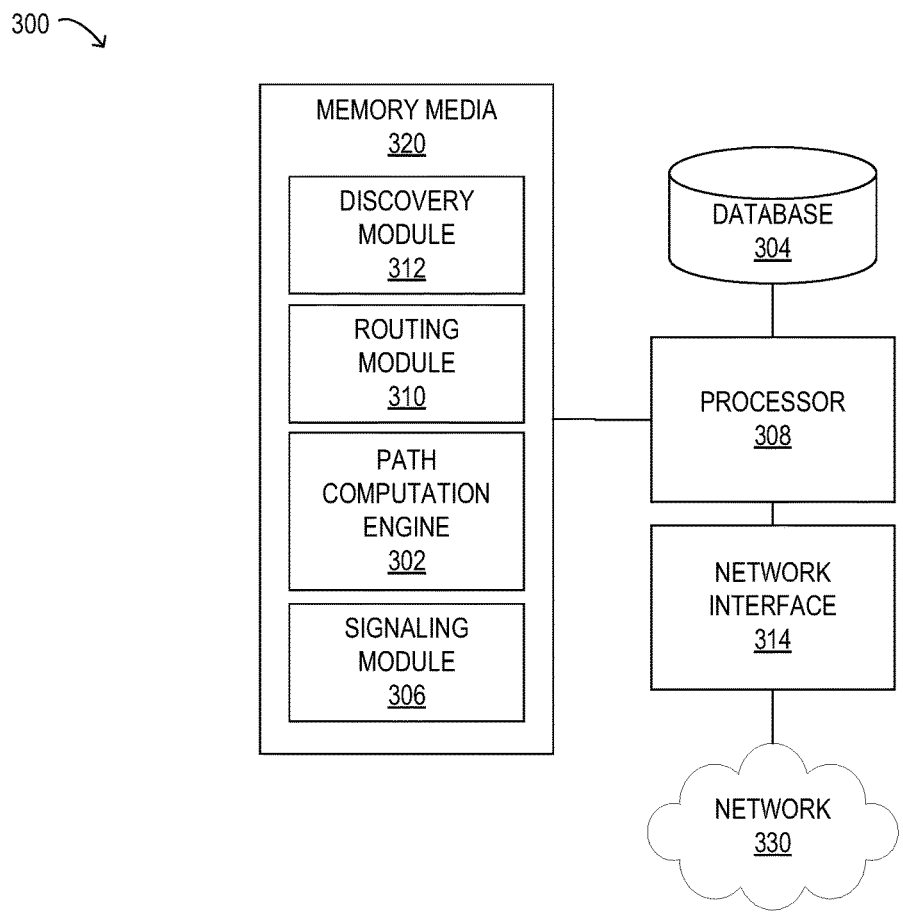
FIG. 3 is a block diagram of selected elements of an embodiment of a network management system for an adaptive optical network.

Referring now to FIG. 3, a block diagram of selected elements of an embodiment of network management system 300 for implementing management plane and/or control plane functionality in an adaptive optical network, such as, for example, in optical network 101 (see FIG. 1) or optical network 200 (see FIG. 2), is illustrated. A management plane and/or a control plane may include functionality for network intelligence and control and may comprise applications that support the ability to establish network services, including applications or modules for discovery, routing, path computation, and signaling, as will be described in further detail. The management and control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (e.g., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical network 101. Network 330 may also include certain portions of a network using galvanic or electronic media. In certain embodiments, network 330 may include at least certain portions of a public network, such as the Internet. Network 330 may be implemented using hardware, software, or various combinations thereof.

In certain embodiments, network management system 300 may be configured to interface with a person (a user) and receive data about the optical signal transmission path. For example, network management system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, network management system 300 may be configured to receive data about the optical signal transmission path from a device such as another computing device or a network element, for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol and may receive data about the optical signal transmission path. In some embodiments, discovery module 312 may determine features, such as, but not limited to: fiber type, fiber length, number and type of components, data rate, modulation format of the data, symbol rate, input power of the optical signal, number of signal carrying wavelengths (i.e., channels), channel spacing, traffic demand, and network topology, among others. In embodiments in which the optical network is used to provide low cost, short reach, high speed data transmission (e.g. inter-data center transmission), topology discovery might not be necessary. For example, the optical signal transmission path may be a point-to-point linear optical link (e.g., a single link or span).

As shown in FIG. 3, routing module 310 may be responsible for propagating link connectivity information to various nodes within an optical network, such as optical network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight to how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304. In embodiments in which the optical network is used to provide low cost, short reach, high speed data transmission (e.g. inter-data center transmission), path computation might not be necessary. For example, the optical signal transmission path may be a point-to-point linear optical link (e.g., a single link or span).

In FIG. 3, signaling module 306 may provide functionality associated with setting up, modifying, and tearing down end-to-end networks services in an optical network, such as optical network 101. For example, when an ingress node in the optical network receives a service request, network management system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of network management system 300, after an optical path has been provisioned, network management system 300 may configure and/or reconfigure transmitters 102 and receivers 112 to implement a suitable modulation format, symbol rate, FEC ratio, and amount of optical power transmitted for the optical path as determined by network management system 300. In at least some embodiments, network management system 300 may monitor a bit error rate (BER) or optical signal-to-noise ratio (OSNR) as a quality metric of a received optical channel (e.g., a single carrier or multi-carrier channel) by receiving the BER or OSNR from a receiver DSP, such as receiver DSP 236 illustrated in FIG. 2. In some embodiments, network management system 300 may calculate a measure of performance (such as a Q-factor) for an optical path from a monitored measure of performance data received from the receiver DSP or may estimate a measure of performance for an optical path using Gaussian Noise modeling.

In some embodiments of the present disclosure, a network management system, such as network management system 240 illustrated in FIG. 2 or network management system 300 illustrated in FIG. 3, may be operable to configure various transponders or other elements of an adaptive optical network for an initial deployment. In this scenario, which represents a start-of-life condition, only a few wavelengths might be needed for a small number of optical paths and the optical paths can be placed at relatively large distances from each other. The farther the optical paths are spaced from each other, the less likely it is that they impact, or are impacted by, other optical paths in the network due, e.g., to fiber nonlinearities or other nonlinear effects that undesirably increase noise. In addition, the performance of the elements of the adaptive optical network is not likely to exhibit the effects of aging at the start-of-life. In this scenario, the adaptive optical network may be configured to operate with high system margin, while assigning high order modulation formats to the optical paths to achieve high capacity.

In some embodiments, when optical paths are added to the adaptive optical network subsequent to its initial deployment, the network management system may be operable to reconfigure one or more transponders or other elements of the adaptive optical network, if needed, to counter the effects of adding optical paths. For example, each time an optical path is added to the optical network at a new wavelength, it might affect the neighboring traffic such that that some wavelengths are no longer able to reach their destinations. In some existing systems, the system margin for each optical path and corresponding wavelength is recalculated and a re-optimization of all optical paths and wavelengths is performed using highly complex network management software each time an optical path is added to the network even though not all wavelengths are affected and need to be re-optimized. The systems described herein may significantly simplify the process of reconfiguring an adaptive optical network when optical paths are added, leading to a more cost effective and efficient use of network management resources in the adaptive optical network.

Figure 4A:
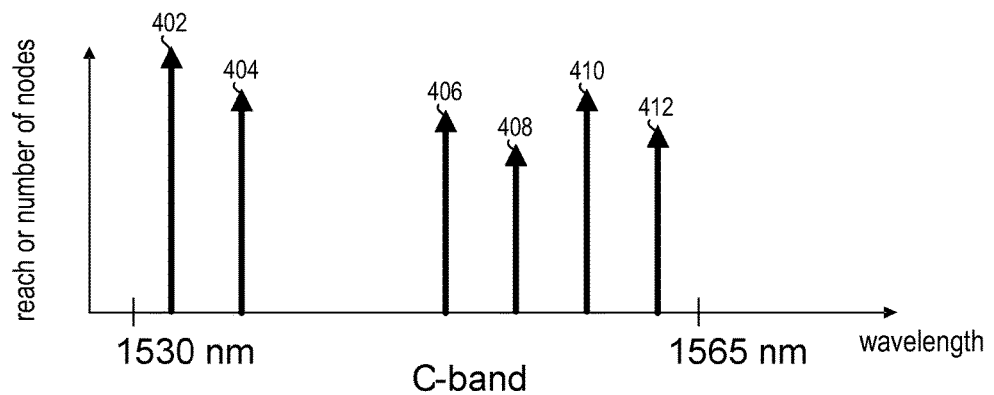
FIGS. 4A and 4B are graphical representations of an initial configuration and deployment of elements of an adaptive optical network, according to one embodiment.
Figure 4B:
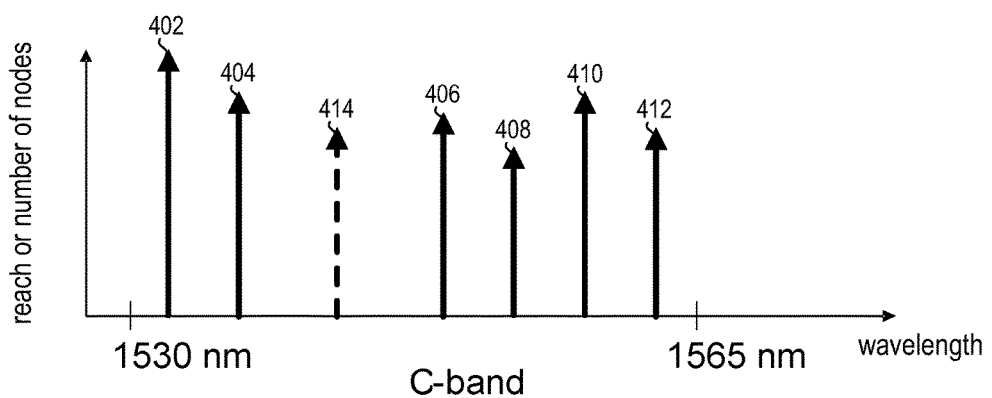

FIGS. 4A and 4B are graphical representations of an initial configuration and deployment of elements of an adaptive optical network, according to one embodiment. In these examples, which are simplified for clarity, the adaptive optical network operates in the C-band, which refers to the wavelength range 1530-1565 nm, corresponding to the amplification range of erbium doped fiber amplifiers (EDFAs). More specifically, FIGS. 4A and 4B illustrate the transmission reach (L) or number of nodes (N) versus the wavelengths in the C-band over which various optical paths are configured for carrying traffic during the initialization of an adaptive optical network. For each optical path, the height of the illustrated arrow indicates either the transmission length or a corresponding number of nodes in the optical path. In FIG. 4A, data representing six optical paths is shown as optical path data 402, 404, 406, 408, 410, and 412 at respective positions indicating the wavelengths at which traffic is transmitted and received for each of the six optical paths.

In this example, a first optical path represented by optical path data 402 is depicted as operating at approximately 1532 nm, a second optical path represented by optical path data 404 is depicted as operating at approximately 1537 nm, a third optical path represented by optical path data 406 is depicted as operating at approximately 1549 nm, a fourth optical path represented by optical path data 408 is depicted as operating at approximately 1553 nm, a fifth optical path represented by optical path data 410 is depicted as operating at approximately 1558 nm, and a sixth optical path represented by optical path data 412 is depicted as operating at approximately 1563 nm. In the illustrated example, the optical path represented by optical path data 408 has a much shorter reach than the optical path represented by optical path data 402, as shown by the respective heights of the arrows representing each optical path.

In the illustrated embodiment, each of the optical paths represented by the optical path data in FIG. 4A may carry traffic using any one of multiple modulation formats supported by the transponders of the adaptive optical network, and different ones of the optical paths may use different ones of the supported modulation formats. Each of the optical paths may also carry traffic using any one of multiple data rates, symbol rates, and/or FEC ratios supported by the transponders. For example, in one embodiment, various ones of the optical paths may operate using 100G DP-QPSK, 150G DP-8-QAM, 200G DP-16-QAM, 250G DP-32-QAM, 300G DP-64-QAM, or other combinations of data rates and modulation formats. In one example, all of the optical paths illustrated in FIG. 4A may operate using a symbol rate of 25 Gbaud. In other embodiments, any one or more of the optical paths may operate at 64 Gbaud, 96 GBaud, or any other symbol rate supported by the transponders in the network. In other words, the optical paths might not all operate at the same symbol rate. In at least some embodiments, the transponders may be operable to implement a dynamically configurable symbol rate. In one example, by doubling the symbol rate for an optical path that was operating using 100G DP-QPSK, the optical path would instead operate using 200G DP-QPSK. In another example, an optical path at one wavelength may operate with 25 GBaud QPSK, and the optical paths on neighboring wavelengths may operate with 50 GBaud 8-QAM and 100 GBaud 16-QAM, respectively. In general, any combinations of modulation formats, data rates, symbol rates, and/or FEC ratios supported by the transponders are possible, where suitable for the particular application.

FIG. 4B illustrates the transmission reach (L) or number of nodes (N) versus the wavelengths in the C-band for the optical paths of the adaptive optical network following the addition, during the initialization of the network, of a seventh optical path. In this example, the seventh optical path is represented by optical path data 414 and is depicted as operating at approximately 1543 nm. In other words, during the initial deployment of an adaptive optical network, there may be plenty of space within the C-band in which to place the seventh optical path and still have sufficient margin to meet reach and/or performance level requirements without affecting traffic on optical paths at neighboring wavelengths. Therefore, the transponders for the seventh optical path may be configured to operate using any modulation format, data rate, symbol rate, and/or FEC ratio supported by the transponders that is suitable for the particular application.

In some embodiments, a network management system such as such as network management system 240 illustrated in FIG. 2 or network management system 300 illustrated in FIG. 3 may, during an initial configuration and deployment of an adaptive optical network, perform operations that are not performed in existing adaptive optical networks. For example, as part of the initial configuration and deployment, the network management system may be operable to determine a safe threshold for a measure of performance for each of the optical paths, which may subsequently be used to simplify the process of reconfiguring the adaptive optical network in response to the addition of optical paths. In some embodiments, a DSP in the receiving transponders for each optical path (such as receiver DSP 236 illustrated in FIG. 2) may be operable to monitor a measure of performance, such as a bit error rate (BER) or optical signal-to-noise ratio (OSNR) during the initial deployment of the adaptive optical network. Because the BER for the signal transmitted over an optical path has a one-to-one relationship with the Q-factor for the transmitted signal, a monitored BER can be converted into a Q-factor for the optical path. The network management system may receive information about the monitored measure of performance from the receiver DSP and may be operable to determine or estimate the probability density function (PDF) of the OSNR or Q-factor of the transmitted signal, which may drift due to environmental factors. Typically, the probability density function has a Gaussian-like distribution.

The network management system may be operable to identify a safe threshold value for the OSNR or Q-factor based on the distribution of the probability density function. In one example, the safe threshold value may be identified as being 1 dB from the FEC threshold for the optical path, which represents a threshold below which all bit errors are successfully identified and corrected at the transponders. In some embodiments, the probability density function of the Q-factor may be calculated by the network management system using optical path performance monitoring and data fitting for a given modulation format and optical path. In some embodiments, if no monitored data based on existing traffic is available, or if performance monitoring is too difficult or expensive in the particular application, the network management system may be operable to calculate the Q-factor based on a Gaussian Noise (GN) model. In some embodiments, the probability density function of the Q-factor may be estimated by the network management system using a Monte Carlo simulation, allowing a range of parameters to be used in the calculation. Because the Q-factor of a modulation format can be converted to the OSNR, the probability density function of the OSNR may be estimated by the network management system based on the probability density function of a measured Q-factor. In some embodiments, dependent on the launch power, OSNR may be calculated by the network management system using a Gaussian Noise (GN) model.

Figure 5A:
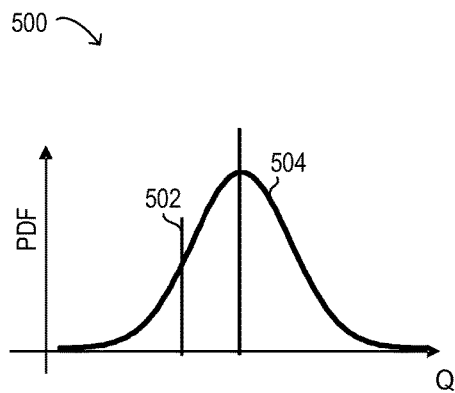
FIGS. 5A and 5B illustrate graphs depicting the distributions of example probability density functions of a Q-factor and an optical signal-to-noise-ratio (OSNR) of a transmitted signal, respectively, according to one embodiment.
Figure 5B:
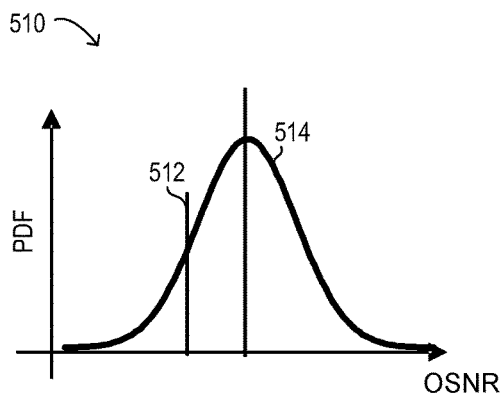

FIG. 5A illustrates a graph 500 depicting the distribution of an example probability density function 504 of the Q-factor of a signal transmitted over a particular optical path in an adaptive optical network. In FIG. 5A, the safe threshold for the Q-factor is shown at 502. FIG. 5B illustrates a graph 510 depicting the distribution of an example probability density function 514 of the OSNR of a signal transmitted over a particular optical path in an adaptive optical network. In FIG. 5B, the safe threshold for the OSNR is shown at 512.

Figure 5C:
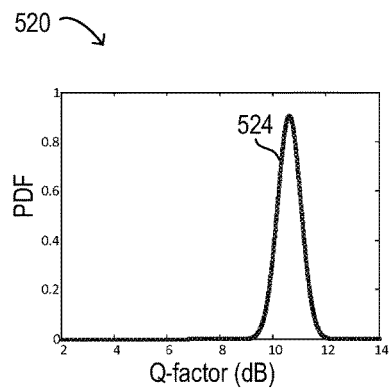
FIGS. 5C and 5D illustrate an example of a relationship between the probability density function of a measured Q-factor and the probability density function of a corresponding OSNR, according to one embodiment.
Figure 5D:
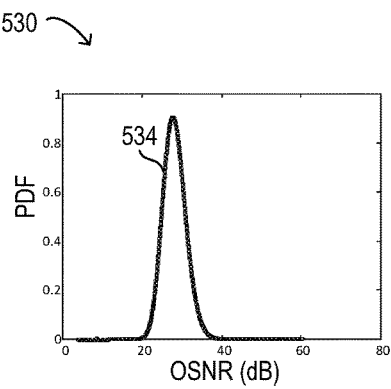

FIGS. 5C and 5D illustrate an example of a relationship between the probability density function of a measured Q-factor 524, depicted in graph 520 in FIG. 5C, and the probability density function of a corresponding OSNR estimated based on the measured Q-factor, depicted in graph 534 in FIG. 5D. In this example, the transponders for the optical path over which the traffic is transmitted are configured for a data rate of 100 Gb/s, and a spectral efficiency of 3.3 b/s/Hz, operating at a symbol rate of 30 GBaud with a modulation format of DP-QPSK.

In some embodiments of the present disclosure, if a monitored OSNR or Q-factor for a given optical path approaches the safe threshold value identified for that measure of performance, the given optical path may be flagged by a network management system (such as network management system 240 illustrated in FIG. 2 or network management system 300 illustrated in FIG. 3) in a database (such as database 304 illustrated in FIG. 3) or may be otherwise designated by the network management system as being at risk for performance degradation due to the addition of optical paths in the adaptive optical network. A determination that the monitored measure of performance is approaching the safe threshold value may be dependent on a predetermined delta between the safe threshold value and the measured value. For example, in one embodiment, the given optical path may be designated as at risk for performance degradation due to the addition of optical paths if the measure of performance is within a predetermined absolute distance from the safe threshold value. In another example embodiment, the given optical path may be designated as being at risk for performance degradation due to the addition of optical paths if the measure of performance is within a predetermined percentage distance from the safe threshold value.

When a new optical path is added in the adaptive optical network, the network management system may be operable to recalculate the system margin for the flagged optical paths (which may potentially be affected by the addition of the new optical path) and, if needed, modify an operating parameter of the optical path to meet performance and/or reach targets following the addition of the new optical path. For example, the network management system may be operable to modify one or more of the modulation format (e.g., from DP-8-QAM to DP-QPSK), the symbol rate, a forward error correction ratio, or an amount of optical power transmitted by the transmitting transponder, in various embodiments. The network management system may be configured to refrain from recalculating the system margins for any optical paths that have not been flagged or otherwise designated as being at risk for performance degradation due to the addition of optical paths. These unflagged optical paths, for which the monitored measures of performance are not approaching a determined safe threshold value, may be much less likely to be affected by the addition of traffic in the adaptive optical network due to their higher margins.

In some embodiments, a database (such as database 304 illustrated in FIG. 3) may be maintained by a network management system (such as network management system 240 illustrated in FIG. 2 or network management system 300 illustrated in FIG. 3) and may be configured to store data representing the respective safe threshold values for various measures of performance and/or the system margins calculated for each optical path in the adaptive optical network. This database may be updated each time an optical path is flagged as being at risk for performance degradation due to additional traffic in the adaptive optical network, each time an at-risk designation is removed from an optical path, and/or each time the system margin for an optical path is recalculated.

Figure 6A:
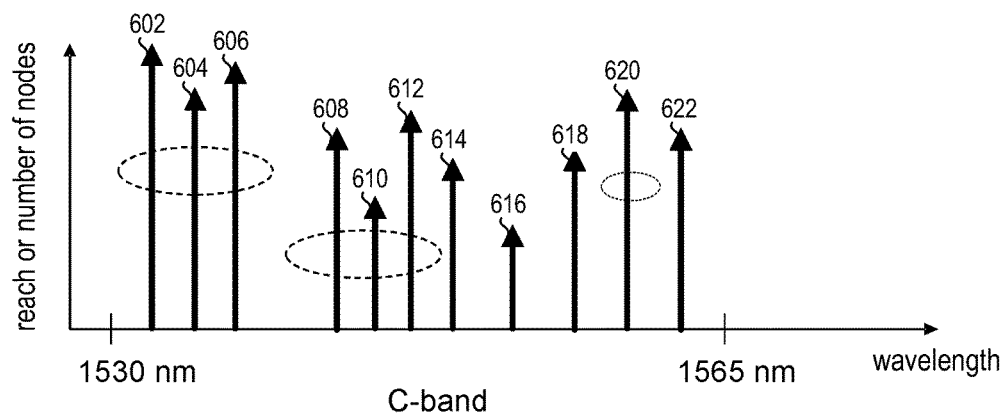
FIGS. 6A-6C are graphical representations of a configuration of elements of an adaptive optical network subsequent to its initial configuration and deployment, according to one embodiment.
Figure 6B:
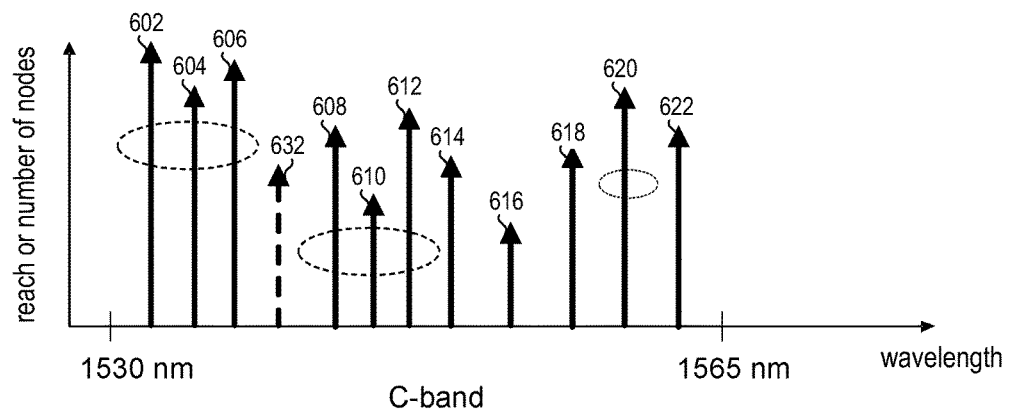
Figure 6C:
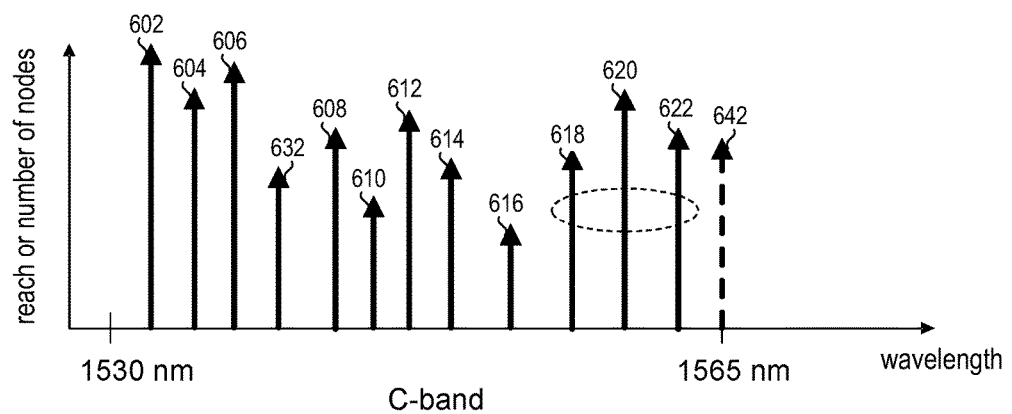

FIGS. 6A-6C are graphical representations of a configuration of elements of an adaptive optical network subsequent to its initial configuration and deployment, according to one embodiment. In these examples, which are simplified for clarity, the adaptive optical network operates in the C-band. More specifically, FIGS. 6A-6C illustrate the transmission reach (L) or number of nodes (N) for an optical path versus the wavelengths in the C-band for various optical paths subsequent to the initialization of an adaptive optical network. For each optical path, the height of the illustrated arrow indicates either the transmission length or a corresponding number of nodes in the optical path.

In FIG. 6A, data representing eleven optical paths is shown as optical path data 602, 604, 606, 608, 610, 612, 614, 616, 618, 620, and 622 at respective positions indicating the wavelengths at which traffic is transmitted and received for each of the eleventh optical paths. The eleven optical paths illustrated in FIG. 6A are spaced closer together than the optical paths in the example initial deployment illustrated in FIGS. 4A and 4B. For example, 602 represents an optical path at approximately 1532 nm, 604 represents an optical path at approximately 1535 nm, 606 represents an optical path at approximately 1538 nm, 608 represents an optical path at approximately 1543 nm, 610 represents an optical path at approximately 1545 nm, 612 represents an optical path at approximately 1548 nm, 614 represents an optical path at approximately 1550 nm, 616 represents an optical path at approximately 1554 nm, 618 represents an optical path at approximately 1556 nm, 620 represents an optical path at approximately 1559 nm, and 622 represents an optical path at approximately 1562 nm. In the illustrated example, the optical path represented by optical path data 616 has a much shorter reach than the optical path represented by optical path data 602, as shown by the respective heights of the arrows representing each optical path. Because the optical paths are already spaced close to each other, the introduction of additional optical paths in the network may affect the optical paths of neighboring wavelengths.

In at least some embodiments, the systems described herein may be operable to monitor a measure of performance, such as an optical signal-to-noise ratio, a bit error ratio, or a Q-factor of all wavelengths on which traffic is being transmitted in the optical network. The systems may also be operable to identify a safe threshold value for the monitored measure of performance or for another measure of performance derived from the monitored data, such as 1 dB from an FEC threshold. Wavelengths for which the measure of performance is determined to be approaching the identified safe threshold value may be flagged as being at risk for performance degradation due to additional traffic in the adaptive optical network, i.e., as having the potential to be affected by the addition of an optical path in the network. In the example illustrated in FIG. 6A, as shown by the dashed ellipses, the optical paths represented by optical path data 602, 604, 606, 608, 610, 612, and 620 have been designated as being at risk for performance degradation due to additional traffic in the adaptive optical network (e.g., due to nonlinear effects that increase noise on the signal). The remaining optical paths, which are represented by optical path data 614, 616, 618, and 622, have not been designated as being at risk for performance degradation due to additional traffic in the adaptive optical network. In some embodiments the optical paths that are not designated as being at risk for performance degradation may have margins much higher than the safe threshold margins (e.g., 2 dB).

FIG. 6B illustrates the optical path data for the adaptive optical network following the addition of a twelfth optical path, represented in FIG. 6B by optical path data 632, at approximately 1541.5 nm. In this example, the optical path represented by optical path data 606 may operate with QPSK, which was sufficient to achieve its relatively long reach prior to the addition of the optical path represented by optical path data 632. However, once the new optical path, which operates with a different symbol and/or a different modulation format, is added nearby, it may introduce increased nonlinear effects on the optical path represented by optical path data 606 as well as the optical path represented by optical path data 608. The result might be that the reach of these two optical paths is reduced and/or that they experience an increased signal loss, such that they might not be able to reach their destinations, or their signals might not be recoverable at their destinations.

When the twelfth optical path is added, a network management system (such as network management system 240 illustrated in FIG. 2 or network management system 300 illustrated in FIG. 3) may be configured to recalculate the system margin for each of the flagged optical paths and, if needed, modify an operating parameter of the optical path to meet performance and/or reach targets following the addition of the new optical path, after which the designation of the optical path as being at risk for performance degradation may be removed. The network management system may be operable to modify one or more of the modulation format, the symbol rate, a forward error correction ratio, or an amount of optical power transmitted by the transmitting transponder, in various embodiments. In one example, the modulation format may be changed from DP-8-QAM to DP-QPSK, which has lower spectral efficiency than DP-8-QAM but has a higher tolerance to fiber non-linearities. In another example, reducing the amount of optical power transmitted by the transmitting transponder may reduce nonlinearities that could affect optical paths on neighboring wavelengths. In still other examples, a symbol rate may be reduced from 50 GBaud to 25 GBaud, or the FEC ratio for an optical path may be modified to counter the effects of the addition of the twelfth optical path. In the illustrated example, the network management system may be configured to refrain from recalculating the system margins for the optical paths that have not been flagged or otherwise designated as being at risk for performance degradation due to the addition of optical paths. These unflagged optical paths, for which the monitored measures of performance are not approaching a determined safe threshold value, may be much less likely to be affected by the addition of the twelfth optical path in the adaptive optical network due to their higher margins.

FIG. 6C illustrates the optical path data for the adaptive optical network following the addition of a thirteenth optical path, represented in FIG. 6C by optical path data 642, at approximately 1565 nm. In this example, following the modification of operating parameters for the optical paths represented by optical data 602, 604, 606, 608, 610, 612, and 620, as described above in reference to FIG. 6B, the designations of these optical paths as being at risk for performance degradation due to additional traffic in the adaptive optical network (e.g., due to nonlinear effects that increase noise on the signal) were removed. However, between the point in time at which these designations were removed and the point in time illustrated in FIG. 6C, subsequent monitoring of the optical paths has led to the designation of optical paths 618, 620, and 622 as being at risk for performance degradation due to additional traffic in the adaptive optical network.

As was the case when the twelfth optical path was added, the network management system may be configured to recalculate the system margin for each of the flagged optical paths and, if needed, modify an operating parameter of the optical path to meet performance and/or reach targets following the addition of the new optical path, after which the designation of the optical path as being at risk for performance degradation may be removed. The network management system may be configured to refrain from recalculating the system margins for the optical paths that have not been flagged or otherwise designated as being at risk for performance degradation due to the addition of optical paths.

Figure 7:
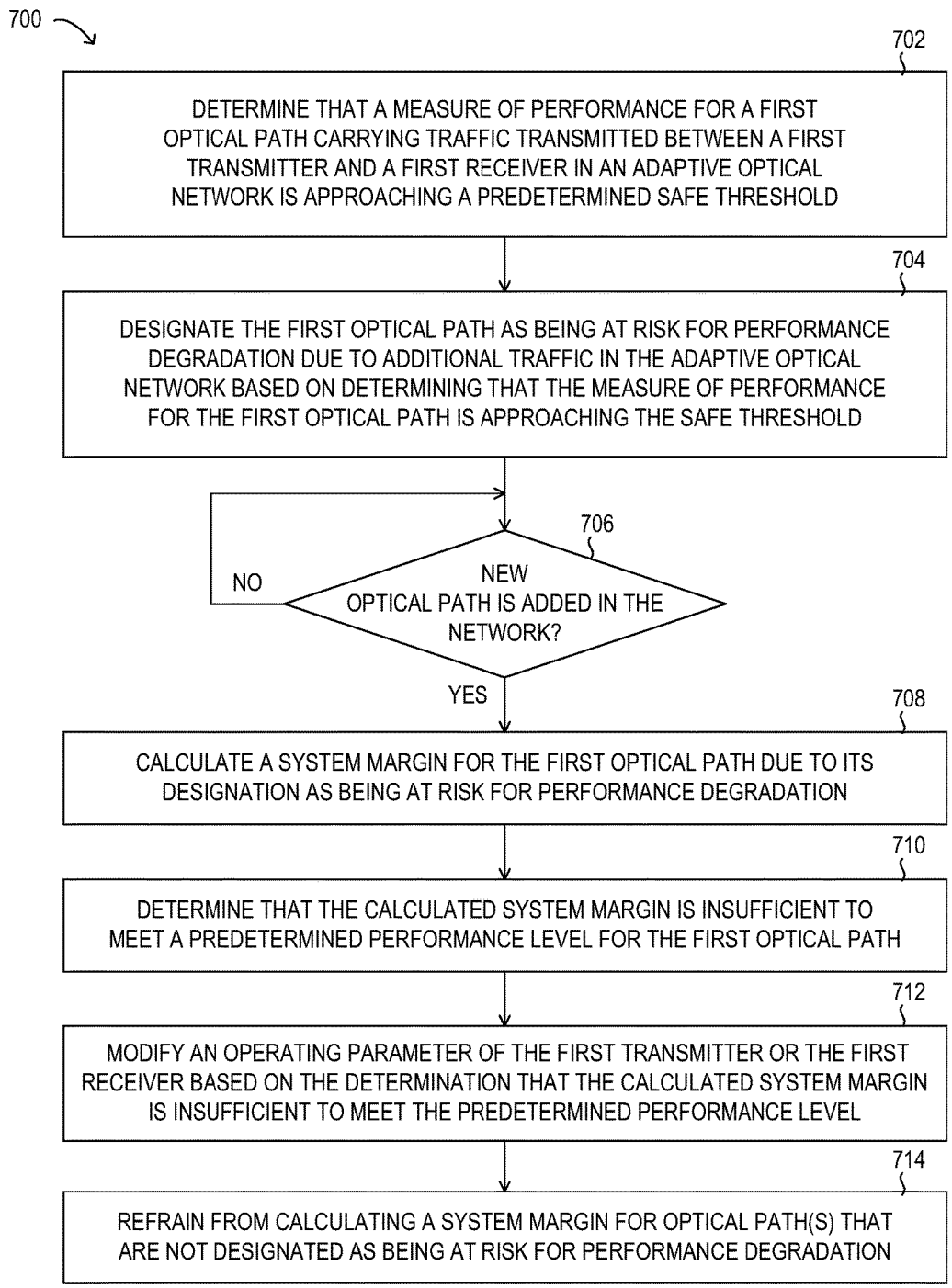
FIG. 7 is a flowchart of selected elements of an embodiment of a method for configuring an adaptive optical network.

Referring now to FIG. 7, a block diagram of selected elements of an embodiment of method for configuring an adaptive optical network is depicted in flowchart form. More specifically, FIG. 7 illustrates a method 700 for reconfiguring an adaptive optical network in response to the addition of an optical path in the network, as described herein. At least certain operations in method 700 may be performed using a network management system, such as network management system 240 illustrated in FIG. 2 or network management system 300 illustrated in FIG. 3. In some embodiments, at least some operations in method 700 may be performed by a path computation engine, such as path computation engine 302 illustrated in FIG. 3 and described above. It is noted that certain operations of the example method 700 illustrated in FIG. 7 may be optional or may be performed in a different order than the order in which they are shown in FIG. 7, in different embodiments.

Figure 8:
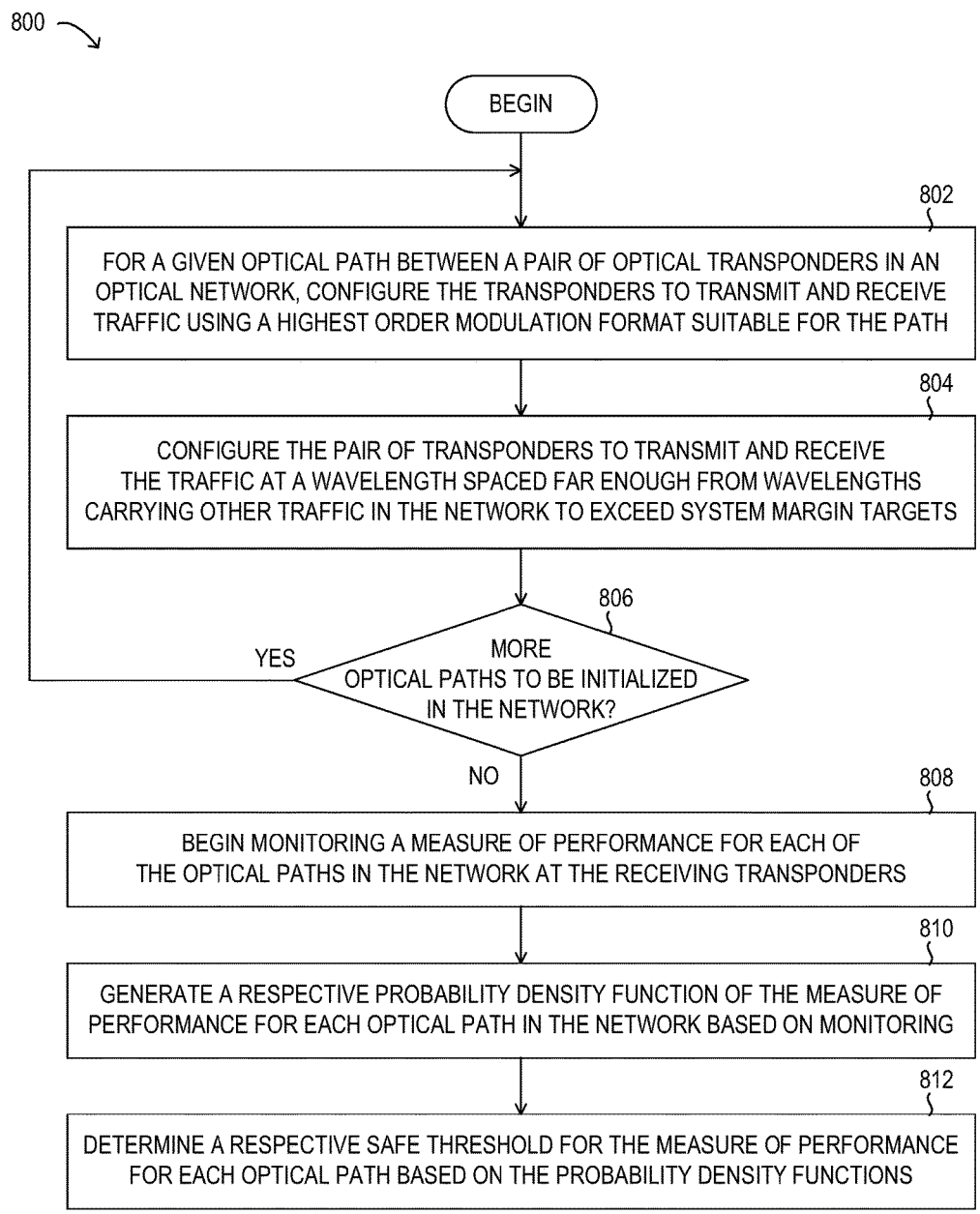
FIG. 8 is a flowchart of selected elements of an embodiment of a method for initializing an adaptive optical network.

In this example embodiment, method 700 begins at 702 by determining that a measure of performance for a first optical path carrying traffic transmitted between a first transmitter and a first receiver in an adaptive optical network is approaching a predetermined safe threshold. For example, in various embodiments, an optical signal-to-noise ratio, a bit error ratio, a Q-factor, or another measure of performance may be monitored, and the monitored values may be compared to a predetermined safe threshold for the particular performance measure and for the first optical path. One example method for determining a safe threshold for a particular performance measure and optical path during initialization of an optical network is illustrated in FIG. 8 and described below.

At 704, the method includes designating the first optical path as being at risk for performance degradation due to additional traffic in the adaptive optical network based at least on determining that the measure of performance for the first optical path is approaching the safe threshold. In some embodiments, a flag associated with each optical path in the adaptive optical network may be maintained by a network management system (such as network management system 240 illustrated in FIG. 2 or network management system 300 illustrated in FIG. 3) in a database (such as database 304 illustrated in FIG. 3) indicating whether or not the optical path is at risk for performance degradation due to additional traffic, and the method may include setting the flag associated with the first optical path to indicate that the first optical path has been designated as being at risk for performance degradation due to additional traffic.

In some embodiments, designating the first optical path as being at risk for performance degradation due to additional traffic may include superimposing a light label on the traffic carried by the first optical path indicating whether or not the optical path is at risk for performance degradation due to additional traffic. For example, in some embodiments, light label signals (e.g., low-speed frequency modulation signals) may be superimposed on the main signal, and a light path trace technology may be used to monitor only the superimposed signal without terminating the main signal at ROADM nodes. For example, superimposition of a frequency modulated signal on the main signal may be done through carrier frequency modulation processing by a DSP on the transmitting side (such as by transmitter DSP 212 illustrated in FIG. 2), and frequency shifting of the main signal spectrum may occur according to the frequency modulation as the result of driving the optical IQ modulator by DAC based on the signal generated by the DSP. The frequency modulated signal may be received as an amplitude modulated signal through conversion of the frequency shift amount into a power deviation based on the wavelength selectivity of the optical filter, the offset of each center frequency of the filter transmission spectrum, and the main signal spectrum, in some embodiments. In embodiments that implement light labeling technology, designating the first optical path as being at risk for performance degradation due to additional traffic in the adaptive optical network may include encoding an indication that the first optical path as at risk for performance degradation due to additional traffic in a frequency modulated light label carried along with the traffic on the first optical path.

At 706, if and when a new optical path is added in the adaptive optical network, method 700 proceeds to 708. At 708, the method includes calculating a system margin for the first optical path due to its designation as being at risk for performance degradation. At 710, the method includes determining that the calculated system margin is insufficient to meet a predetermined performance level for the first optical path.

At 712, based at least on determining that the calculated system margin is insufficient for the predetermined performance level for the first optical path, the method includes modifying an operating parameter of the first transmitter or the first receiver. For example, the method may include modifying at least one of a modulation format, a symbol rate, a forward error correction ratio, and an amount of optical power transmitted by the first transmitter. In some embodiments, the modification of the operating parameter or parameters may cause the optical path to meet the predetermined performance level with sufficient system margin. The method may also include refraining from calculating a system margin for optical path(s) that are not designated as being at risk for performance degradation, as in 714.

Figure 9:
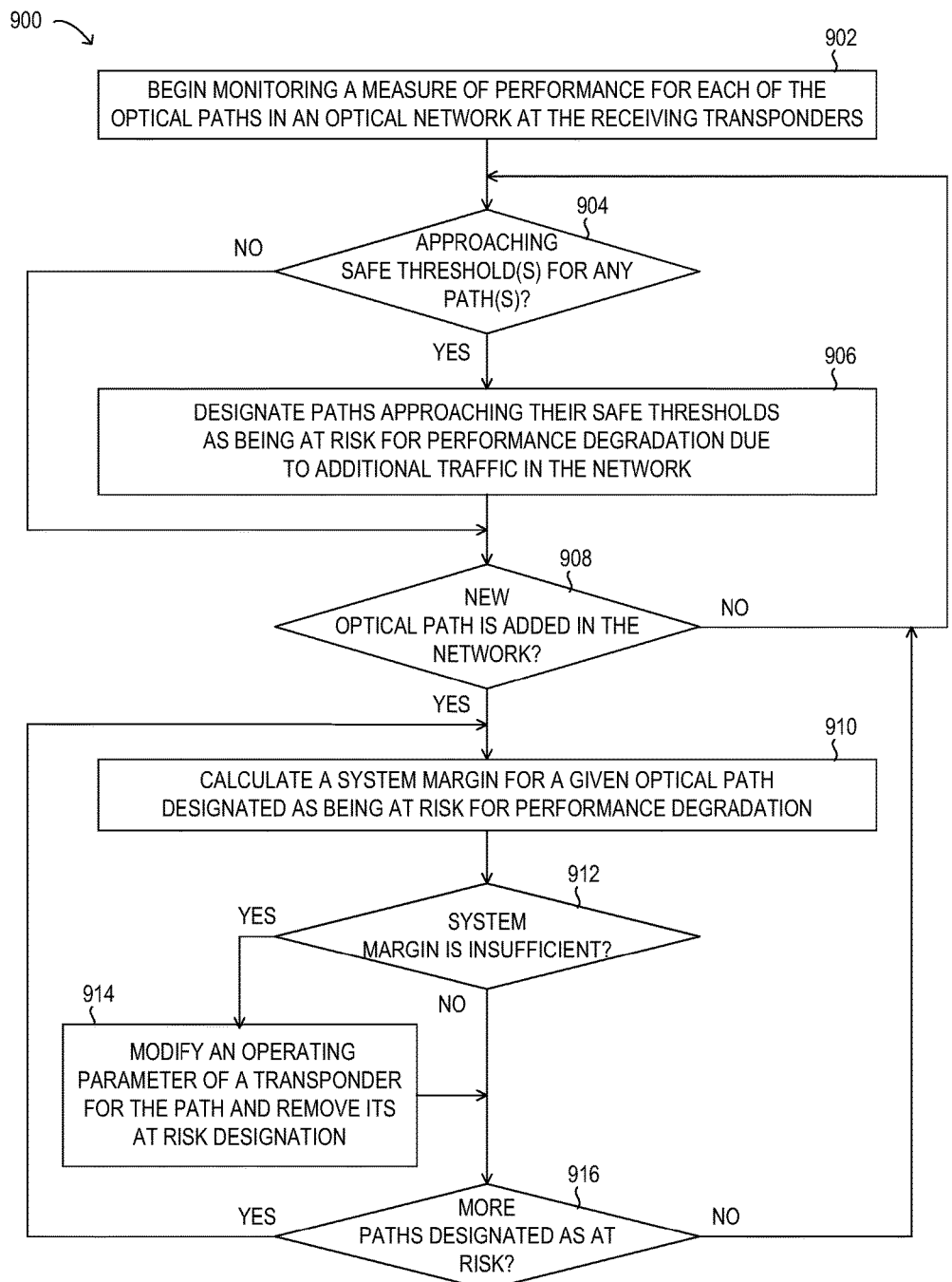
FIG. 9 is a flowchart of selected elements of an embodiment of a method for reconfiguring an adaptive optical network in response to the addition of an optical path in the network.

One example method for reconfiguring an adaptive optical network in response to the addition of an optical path in during operation of the adaptive optical network is illustrated in FIG. 9 and described in more detail below.

Referring now to FIG. 8, a block diagram of selected elements of an embodiment of method for initializing an adaptive optical network is depicted in flowchart form. More specifically, FIG. 8 illustrates a method 800 for configuring and deploying optical transponders in an adaptive optical network for transmitting and receiving traffic on respective optical paths at particular wavelengths, and for determining safe thresholds for various measures of performance for these initial optical paths of the network, as described herein. At least certain operations in method 800 may be performed using a network management system, such as network management system 240 illustrated in FIG. 2 or network management system 300 illustrated in FIG. 3. In some embodiments, at least some operations in method 800 may be performed by a path computation engine, such as path computation engine 302 illustrated in FIG. 3 and described above. It is noted that certain operations of the example method 800 illustrated in FIG. 8 may be optional or may be performed in a different order than the order in which they are shown in FIG. 8, in different embodiments.

In this example embodiment, method 800 begins and at 802 includes, for a given optical path between a pair of optical transponders in an optical network, configuring the transponders to transmit and receive traffic using a highest order modulation format suitable for the path. At 804, the method includes configuring the pair of transponders to transmit and receive the traffic at a wavelength spaced far enough from wavelengths carrying other traffic in the network to exceed system margin targets. In some embodiments, the method may include configuring other initial operating parameters for the given optical path, such as the FEC ratio or the amount of power transmitted by the transmitting transponder, among others.

If, at 806, it is determined that there are more optical paths to be initialized in the network, method 800 returns to 802, and the operations shown in 802 and 804 are repeated for each additional optical path to be initialized in the network. If, at 806, it is determined that there are no more optical paths to be initialized in the network, method 800 proceeds to 808. At 808, the method includes beginning to monitor a measure of performance for each of the optical paths in the network at the receiving transponders.

At 810, the method includes generating a respective probability density function of the measure of performance for each optical path in the network based at least on the monitoring. At 812, the method includes determining a respective safe threshold for the measure of performance for each optical path based at least on the probability density functions. In some embodiments, the respective safe threshold values for the measure of performance for each optical path may be stored in a database (such as database 304 illustrated in FIG. 3) by the network management system. In some embodiments, the operations shown at 808-812 may be performed to determine a respective safe threshold for a measure of performance for any optical paths that are added in the adaptive optical network subsequent to the initial configuration and deployment of the adaptive optical network.

Referring now to FIG. 9, a block diagram of selected elements of an embodiment of method for reconfiguring an adaptive optical network in response to the addition of an optical path in the network is depicted in flowchart form. More specifically, FIG. 9 illustrates a method 900 for designating particular optical paths in the network as being at risk for performance degradation due the addition of optical paths, and for calculating system margins only for those optical paths so designated when an additional optical path is added in the network subsequent to its initial deployment, as described herein. At least certain operations in method 900 may be performed using a network management system, such as network management system 240 illustrated in FIG. 2 or network management system 300 illustrated in FIG. 3. In some embodiments, at least some operations in method 900 may be performed by a path computation engine, such as path computation engine 302 illustrated in FIG. 3 and described above. It is noted that certain operations of the example method 900 illustrated in FIG. 9 may be optional or may be performed in a different order than the order in which they are shown in FIG. 9, in different embodiments.

In this example embodiment, method 900 begins at 902 by beginning to monitor a measure of performance for each of the optical paths in an optical network at the receiving transponders. If, at 904, it is determined that a safe threshold for a measure of performance for any of the optical paths in the network is being approached, method 900 continues at 906. Otherwise method 900 proceeds to 908. At 906, the method includes designating optical paths for which the monitored measures of performance are approaching their safe thresholds as being at risk for performance degradation due to additional traffic in the network. In some embodiments, a flag associated with each optical path in the adaptive optical network may be maintained by a network management system (such as network management system 240 illustrated in FIG. 2 or network management system 300 illustrated in FIG. 3) in a database (such as database 304 illustrated in FIG. 3) indicating whether or not the optical path is at risk for performance degradation due to additional traffic, and the method may include setting the flags associated with the optical paths for which the monitored measures of performance are approaching their safe thresholds to indicate that these optical paths have been designated as being at risk for performance degradation due to additional traffic. In some embodiments, designating these optical paths as being at risk for performance degradation due to additional traffic may include superimposing light labels on the traffic carried by the optical paths indicating that they are at risk for performance degradation due to additional traffic.

If, at 908, a new optical path is added in the network, method 900 proceeds to 910. Otherwise, method 900 returns to 904 while continuing to monitor the measures of performance for each of the optical paths. At 910, the method includes calculating a system margin for a given optical path that has been designated as being at risk for performance degradation due to additional traffic in the adaptive optical network (e.g., due to nonlinear effects that increase noise on the signal). If, at 912, it is determined that the calculated system margin is insufficient to meet a predetermined performance level for the given optical path, method 900 proceeds to 914, where an operating parameter of a transponder for the given optical path is modified and its at-risk designation is removed. For example, the method may include modifying at least one of a modulation format, a symbol rate, a forward error correction ratio, and an amount of optical power transmitted by the transmitting transponder for the given optical path. In some embodiments, following the modification of one such operating parameter, the network management system may be operable to recalculate the system margin for the given optical path.

If the system margin is still insufficient to meet the predetermined performance level for the given optical path, the method may include further modifying the operating parameter or modifying another operating parameter and again recalculating the system margin for the given optical path. In some embodiments, these operations may be repeated until the calculated system margin is sufficient to meet the predetermined performance level for the given optical path, and only then is the designation of the given optical path as being at risk for performance degradation due to additional traffic removed. In some embodiments, the operations shown at 808-812 in FIG. 8 may be performed to determine a respective safe threshold for a measure of performance for the new optical path (not shown).

Subsequent to modifying an operating parameter of a transponder for the given optical path, or in response to determining that the calculated system margin is sufficient to meet the predetermined performance level for the given optical path, method 900 proceeds to 916. If, at 916, there are more optical paths designated as being at risk for performance degradation, method 900 returns to 910 and the operations shown as 910 to 914 are repeated, as appropriate, for each additional optical path so designated. If there are no additional optical paths designated as being at risk for performance degradation, method 900 returns to 904 while continuing to monitor the measures of performance for each of the optical paths. The operations illustrated in FIG. 9 may be repeat indefinitely by the network management system during operation of the adaptive optical network.

The systems and methods disclosed herein may be used to dynamically optimize an adaptive optical network in response to the addition of new optical paths in the network while using computation resources of a network management system efficiently and cost-effectively. For example, by first identifying any existing optical paths that are at risk for performance degradation due to additional traffic in the adaptive optical network, and recalculating the system margins only for the identified optical paths when optical paths are added in the network, the complexity of the network management software used to reconfigure elements of the network in response to the addition of the optical paths may be significantly simplified, when compared to existing systems.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for configuring an adaptive optical network, comprising:
   determining that a measure of performance for a first optical path of a plurality of optical paths in the adaptive optical network is approaching a predetermined safe threshold, the first optical path carrying traffic transmitted between a first transmitter and a first receiver;
   designating the first optical path as being at risk for performance degradation due to additional traffic in the adaptive optical network based at least on determining that the measure of performance for the first optical path is approaching the predetermined safe threshold; and
   in response to a new optical path being added in the adaptive optical network:
      calculating a first system margin for the first optical path in the adaptive optical network, the first system margin representing a difference between an optical signal-to-noise ratio (OSNR) delivered to the first receiver on the first optical path and a required OSNR for error-free operation on the first optical path;
      determining that the calculated first system margin is insufficient to meet a respective performance level for the first optical path;
      modifying an operating parameter of the first transmitter or the first receiver based at least on determining that the calculated first system margin is insufficient to meet the given performance level for the first optical path; and
      refraining from calculating a system margin for a second optical path of the plurality of optical paths in the adaptive optical network that is not designated as being at risk for performance degradation due to additional traffic in the adaptive optical network, the second optical path carrying traffic transmitted between a second transmitter and a second receiver.

2. The method of claim 1, further comprising, in response to the new optical path being added in the adaptive optical network:
   calculating a second system margin for a third optical path in the adaptive optical network, the third optical path carrying traffic transmitted between a third transmitter and a third receiver, the second system margin representing a difference between an OSNR delivered to the third receiver on the third optical path and a required OSNR for error-free operation on the third optical path;
   determining that the calculated second system margin is sufficient to meet a respective performance level for the third optical path; and
   refraining from modifying an operating parameter of the third transmitter or the third receiver based at least on determining that the calculated second system margin is sufficient to meet the respective performance level for the third optical path.

3. The method of claim 1, further comprising:
   generating, for each of the optical paths in the adaptive optical network, a respective probability density function for the measure of performance; and
   determining the safe threshold for the measure of performance for the first optical path based at least on the respective probability density function for the first optical path.

4. The method of claim 3, wherein generating the respective probability density function for the measure of performance comprises at least one of:
   monitoring the measure of performance for the plurality of optical paths in the adaptive optical network during operation of the adaptive optical network and generating the respective probability density function for the measure of performance based at least on the monitoring;
   calculating the respective probability density function using data fitting;
   estimating the respective probability density function using a Gaussian noise model; and
   estimating the respective probability density function using a Monte Carlo simulation.

5. The method of claim 1, wherein the measure of performance comprises an optical signal-to-noise ratio, a bit error ratio, or a Q-factor.

6. The method of claim 1, wherein modifying an operating parameter of the first transmitter or the first receiver comprises modifying at least one of a modulation format, a symbol rate, a forward error correction ratio, and an amount of optical power transmitted by the first transmitter.

7. The method of claim 1, further comprising, subsequent to modifying the operating parameter of the first transmitter or the first receiver:
   removing the designation of the first optical path as being at risk for performance degradation due to additional traffic in the adaptive optical network.

8. The method of claim 1, further comprising:
   prior to determining that a measure of performance for the first optical path is approaching a predetermined safe threshold, configuring respective pairs of transmitters and receivers in the adaptive optical network, including the first transmitter and the first receiver, to transmit and receive traffic on respective ones of the plurality of optical paths in the adaptive optical network, the configuring including selecting, for each pair of transmitters and receivers, a respective wavelength over which the respective optical path carries traffic based at least on a predetermined system margin for the adaptive optical network; and
   adding the new optical path at a wavelength that is unused by the plurality of optical paths in the adaptive optical network.

9. The method of claim 1, wherein designating the first optical path as being at risk for performance degradation due to additional traffic in the adaptive optical network comprises encoding an indication that the first optical path is at risk for performance degradation due to additional traffic in a frequency modulated light label carried along with the traffic transmitted between the first transmitter and the first receiver on the first optical path.

10. A system for implementing an adaptive optical network, the system comprising:
    a plurality of optical transponders; and
    a network management system comprising memory media and a processor having access to the memory media, wherein the memory media store instructions executable by the processor for:
       determining that a measure of performance for a first optical path of a plurality of optical paths in the adaptive optical network is approaching a predetermined safe threshold, the first optical path carrying traffic transmitted between a first one of the optical transponders and a second one of the optical transponders;

designating the first optical path as being at risk for performance degradation due to additional traffic in the adaptive optical network based at least on determining that the measure of performance for the first optical path is approaching the predetermined safe threshold; and in response to a new optical path being added in the adaptive optical network:
calculating a first system margin for the first optical path in the adaptive optical network, the first system margin representing a difference between an optical signal-to-noise ratio (OSNR) delivered to the first receiver on the first optical path and a required OSNR for error-free operation on the first optical path;
determining that the calculated first system margin is insufficient to meet a respective performance level for the first optical path;
modifying an operating parameter of the first optical transponder or the second optical transponder based at least on determining that the calculated first system margin is insufficient to meet the given performance level for the first optical path; and
refraining from calculating a system margin for a second optical path of the plurality of optical paths in the adaptive optical network that is not designated as being at risk for performance degradation due to additional traffic in the adaptive optical network, the second optical path carrying traffic transmitted between a third one of the optical transponders and a fourth one of the optical transponders.

11. The system of claim 10, wherein the memory media further store instructions executable by the processor for, in response to the new optical path being added in the adaptive optical network:
calculating a second system margin for a third optical path in the adaptive optical network, the third optical path carrying traffic transmitted between a fifth one of the optical transponders and a sixth one of the optical transponders, the second system margin representing a difference between an OSNR delivered to the third receiver on the third optical path and a required OSNR for error-free operation on the third optical path;
determining that the calculated second system margin is sufficient to meet a respective performance level for the third optical path; and
refraining from modifying an operating parameter of the fifth optical transponder or the sixth optical transponder based at least on determining that the calculated second system margin is sufficient to meet the respective performance level for the third optical path.

12. The system of claim 10, wherein the memory media further store instructions executable by the processor for:
generating, for each of the optical paths in the adaptive optical network, a respective probability density function for the measure of performance; and
determining the safe threshold for the measure of performance for the first optical path based at least on the respective probability density function for the first optical path.

13. The system of claim 10, wherein the measure of performance comprises an optical signal-to-noise ratio, a bit error ratio, or a Q-factor.

14. The system of claim 10, wherein modifying an operating parameter of the first optical transponder or the second optical transponder comprises modifying at least one of a modulation format, a symbol rate, a forward error correction ratio, and an amount of optical power transmitted by the first optical transponder.

15. The system of claim 10, wherein the memory media further store instructions executable by the processor for:
removing the designation of the first optical path as being at risk for performance degradation due to additional traffic in the adaptive optical network subsequent to modifying the operating parameter of the first optical transponder or the second optical transponder.

16. The system of claim 10, wherein the memory media further store instructions executable by the processor for:
prior to determining that a measure of performance for the first optical path is approaching a predetermined safe threshold, configuring respective pairs of optical transponders in the adaptive optical network, including the first optical transponder and the second optical transponder, to transmit and receive traffic on respective ones of the plurality of optical paths in the adaptive optical network, the configuring including selecting, for each pair of optical transponders, a respective wavelength over which the respective optical path carries traffic based at least on a predetermined system margin for the adaptive optical network; and
adding the new optical path at a wavelength that is unused by the plurality of optical paths in the adaptive optical network.

17. The system of claim 10, wherein designating the first optical path as being at risk for performance degradation due to additional traffic in the adaptive optical network comprises encoding an indication that the first optical path is at risk for performance degradation due to additional traffic in a frequency modulated light label carried along with the traffic transmitted between the first optical transponder and the second optical transponder on the first optical path.

* * * * *